United States Patent
Kai

(10) Patent No.: US 8,705,063 B2
(45) Date of Patent: Apr. 22, 2014

(54) INFORMATION PROCESSING APPARATUS, CONTROL METHOD, AND STORAGE MEDIUM

(71) Applicant: Canon Kabushiki Kaisha, Tokyo (JP)

(72) Inventor: Hiroshi Kai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/763,907

(22) Filed: Feb. 11, 2013

(65) Prior Publication Data

US 2013/0215444 A1    Aug. 22, 2013

(30) Foreign Application Priority Data

Feb. 20, 2012  (JP) ................................. 2012-033759

(51) Int. Cl.
- *G06F 3/12* (2006.01)
- *G06K 15/00* (2006.01)
- *H04N 1/00* (2006.01)
- *G06F 3/00* (2006.01)

(52) U.S. Cl.
USPC ... 358/1.13; 358/1.14; 358/1.15; 358/426.09; 710/15; 710/16; 710/19

(58) Field of Classification Search
None
See application file for complete search history.

(56) References Cited

U.S. PATENT DOCUMENTS

| | | | |
|---|---|---|---|
| 2005/0039091 A1* | 2/2005 | Hanaoka | 714/724 |
| 2009/0244620 A1* | 10/2009 | Takahashi et al. | 358/1.15 |
| 2013/0100490 A1* | 4/2013 | Imoto | 358/1.15 |

FOREIGN PATENT DOCUMENTS

JP        2009-59116 A       3/2009

* cited by examiner

*Primary Examiner* — Thomas Lett
(74) *Attorney, Agent, or Firm* — Carter, DeLuca, Farrell & Schmidt, LLP

(57) ABSTRACT

A next generation application issues a status information request for acquiring status information from a print device. A next generation driver executes status information acquisition processing from the print device and generates coupled information by coupling the acquired status information each time the status information is acquired to thereby determine whether or not a specific code was acquired based on the coupled information. When the specific code was not acquired from the image forming device, the next generation driver determines whether or not the number of execution times of status information acquisition processing is within a threshold value. The next generation driver acquires information corresponding to a status designated by the status information request from the coupled information when the next generation driver determines that the number of execution times of the status information acquisition processing exceeds the threshold value and responds the information to a requesting unit.

15 Claims, 17 Drawing Sheets

FIG. 3
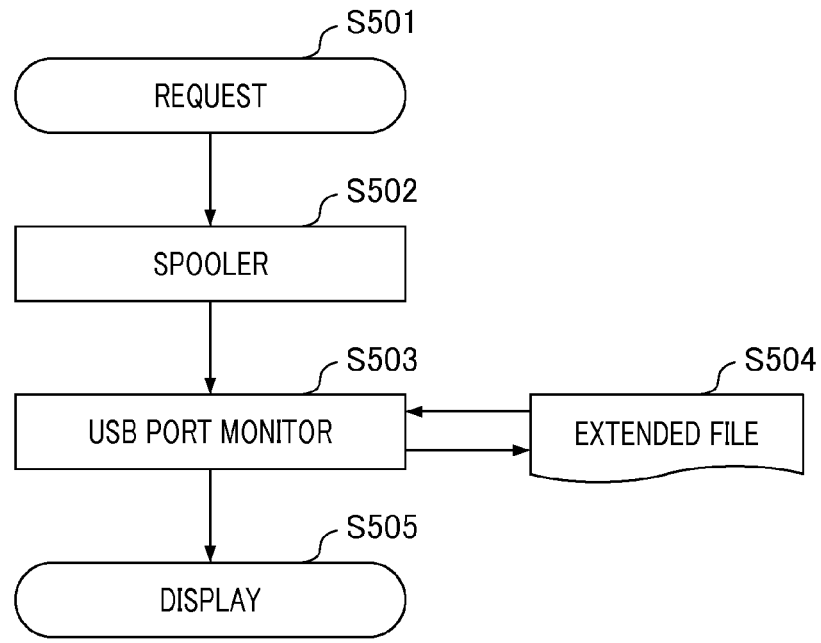
FIG. 4A
FIG. 4B
(Example of inquiry)
"¥Printer.Status.Summary:StateReason"
FIG. 4C
(Example of response)
"MediaJam" (Indicating paper jam state)

(Example of inquiry)
"¥Printer.Status.Summary:StateReason"

(Example of response)
"MediaJam" (Indicating paper jam state)
"ERR1" (Indicating the fact that no status information was successfully acquired)
"ERR2" (Indicating the fact that only partial status information was successfully acquired)

FIG. 17A

| Printer XXX status display |
|---|
| Paper jammed in printer |

FIG. 17B

| Printer XXX status display |
|---|
| Status information could not be acquired. Please wait for some time. |

FIG. 17C

| Printer XXX status display |
|---|
| Status information could not be acquired. Please check that printer power source is turned on and printer and PC are correctly connected |

INFORMATION PROCESSING APPARATUS, CONTROL METHOD, AND STORAGE MEDIUM

BACKGROUND OF THE INVENTION

1. Field of the Invention

The present invention relates to an information processing apparatus a control method, and a storage medium.

2. Description of the Related Art

There has been proposed an information processing apparatus that makes a status information request for transmitting printer status information to a printer (image forming device). More specifically, a printer driver (hereinafter referred to as "legacy driver") with a legacy architecture provided in an information processing apparatus acquires printer status information.

The legacy driver controls the interval for a status information request to a printer using a language monitor. More specifically, the language monitor repeatedly performs status request processing for a printer using a time-measurement API provided by OS while maintaining an appropriate time interval during which a printer and a PC (information processing apparatus) may perform processing. Japanese Patent Laid-Open No. 2009-59116 discloses an information processing apparatus that acquires status information from a printer with a predetermined period.

In recent years, there has been proposed a new operating system (hereinafter referred to as "OS") that supports not only desktop PCs but also mobile PCs. It is required that application, printer drivers, and the like support a next generation architecture installed on a new OS.

However, there are some constraints on a new OS, and thus, application or printer drivers running on the OS may not be able to appropriately execute acquisition of status information. For example, a driver supporting a new OS may have limitations on which any object having a time-measurement function cannot be used. Thus, in the information processing apparatus having the driver, a status information request is indefinitely repeated for a short period of time.

SUMMARY OF THE INVENTION

The information processing apparatus of the present invention is an apparatus that acquires status information about an image forming device and prevents a status information request for an image forming device from being indefinitely repeated for a short period of time.

According to an aspect of the present invention, an information processing apparatus is provided that includes a requesting unit configured to issue a status information request for acquiring status information from an image forming device; an acquiring unit configured to execute status information acquisition processing from the image forming device in accordance with the issued status information request; a coupling unit configured to generate coupled information by coupling the acquired status information each time the status information is acquired; a first determining unit configured to determine a specific code was acquired from the image forming device; a second determining unit configured to compare the number of execution times of the status information acquisition processing with a predetermined threshold value when the first determining unit determines that the specific code was not acquired from the image forming device and determine whether or not the number of execution times of the status information acquisition processing is within the threshold value; and a responding unit configured to acquire information corresponding to a status designated by the status information request from the coupled information when the second determining unit determines that the number of execution times of the status information acquisition processing exceeds the threshold value and respond with return information including the acquired information.

Further features of the present invention will become apparent from the following description of exemplary embodiments with reference to the attached drawings.

BRIEF DESCRIPTION OF THE DRAWINGS

FIG. 3 is a flowchart illustrating an example of operation processing performed by the information processing apparatus of the present embodiment.

FIGS. 4A to 4C are diagrams illustrating examples of status information, an inquiry by a status information request, and response information.

FIGS. 17A to 17C show examples of a status display screen by a next generation application.

DESCRIPTION OF THE EMBODIMENTS

Figure 18:
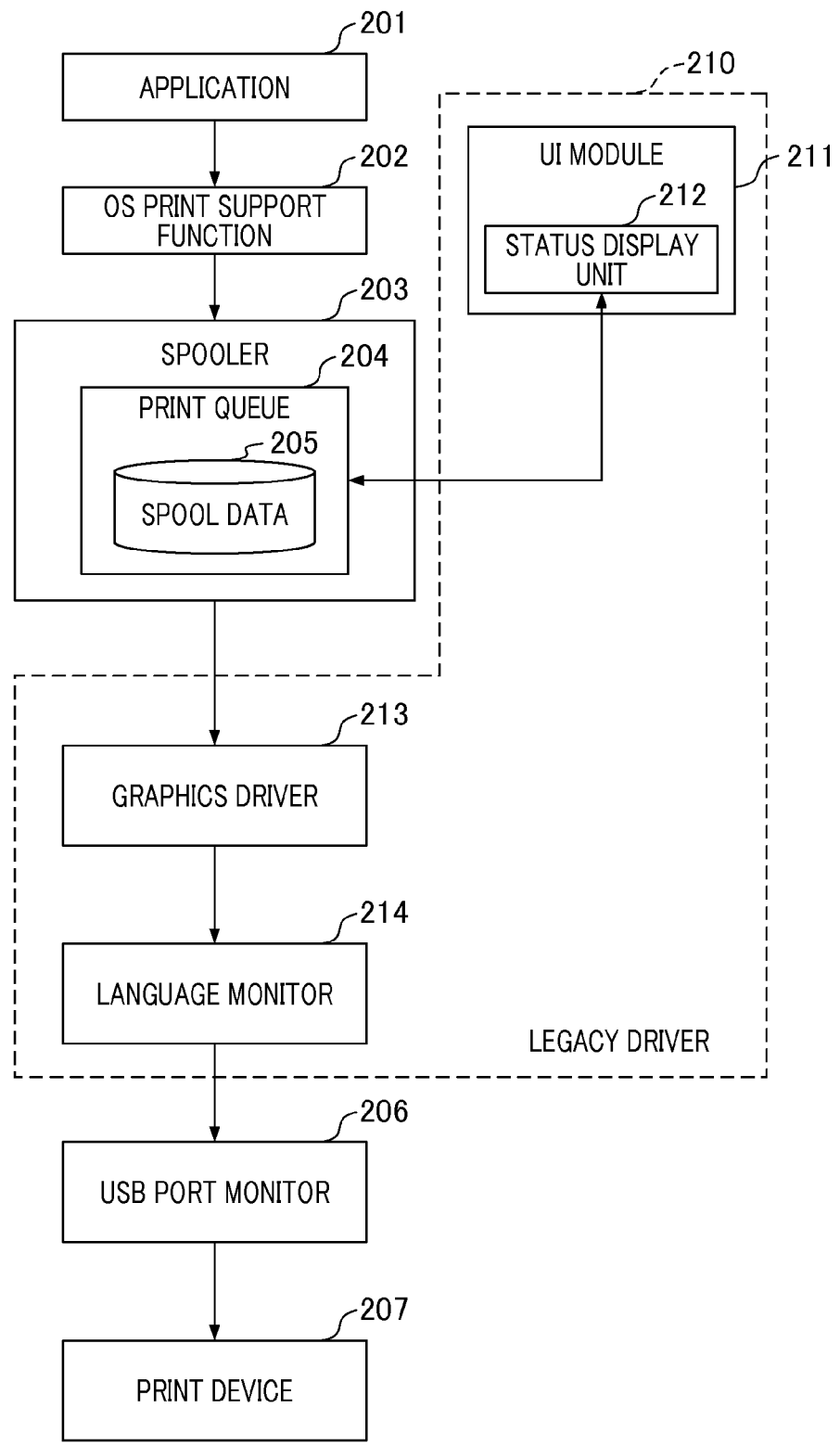
FIG. 18 shows an exemplary functional block diagram of a legacy driver.

FIG. 18 shows an exemplary functional block diagram of a legacy driver provided in a conventional information processing apparatus. The information processing apparatus includes an application 201, an OS print support function 202, a spooler 203, a print queue 204, spool data 205, and a USB port monitor 206. The information processing apparatus also includes a legacy driver 210. The legacy driver 210 includes a UI module 211, a graphics driver 213, and a language monitor 214.

The application 201 creates print data, and the OS print support function 202 adds print setting information returned from the UI module 211 to the created print data, and temporarily store the resulting data in the print queue 204 of the spooler 203. The temporarily stored data is the spool data 205. The spool data 205 is converted into a print command that is interpretable by a print device 207 by the legacy driver 210, and then is output to the USB port monitor 206.

The USB port monitor 206 transmits the input print command to the image forming device (print device) 207. The UI module 211 can have a status display unit 212 that displays the status of the print device 207. A user can confirm status information about the print device 207 by activating the status display unit 212 from the UI screen provided by the UI module 211.

Figure 19:
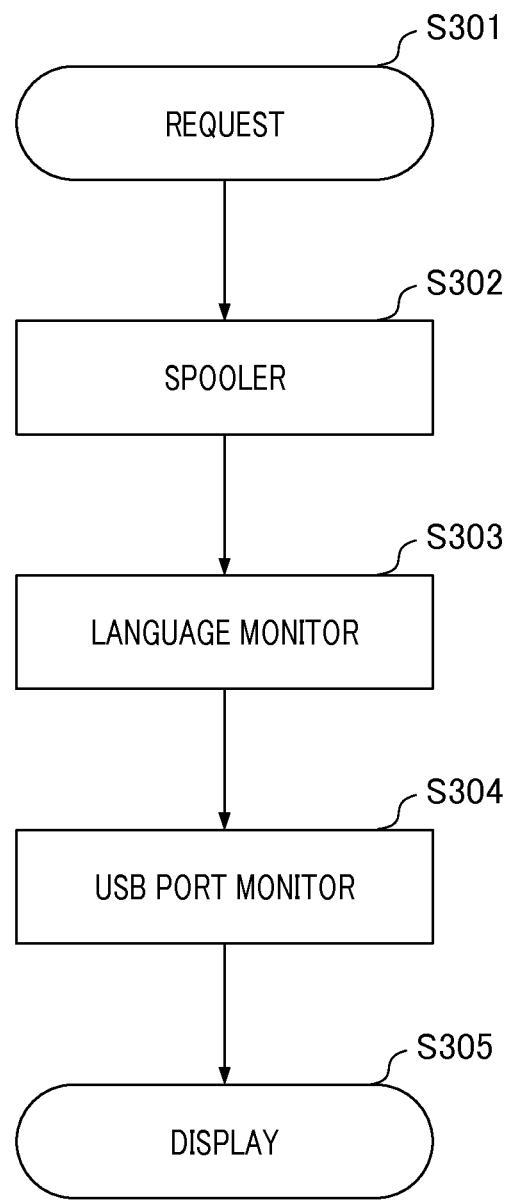
FIG. 19 is a flowchart illustrating an example of operation processing performed by a legacy driver.

FIG. 19 is a flowchart illustrating an example of operation processing performed by the legacy driver 210 shown in FIG. 18. Firstly, the status display unit 212 requests status information about the print device 207 to the spooler 203 (step S301). The spooler 203 requests the language monitor 214 to acquire status information about the print device 207 (step S302). The language monitor 214 calls the USB port monitor 206 (step S303).

The USB port monitor 206 performs communication processing with the print device 207 to thereby acquire status information (step S304). The status information acquired by the USB port monitor 206 is reported to the status display unit 212 via the language monitor 214 and the spooler 203. The status display unit 212 displays the status of the print device 207 based on the acquired status information (step S305).

In the conventional information processing apparatus described with reference to FIGS. 18 and 19, the language monitor 214 provided in the legacy driver repeatedly performs status information request processing for the print device 207 while maintaining a predetermined time interval. However, as described above, a driver supporting a new OS cannot use any object having a time-measurement function. Thus, in the information processing apparatus having the driver, a status information request is indefinitely repeated for a short period of time. The information processing apparatus of the present embodiment as described below can solve the problem.

Figure 1:
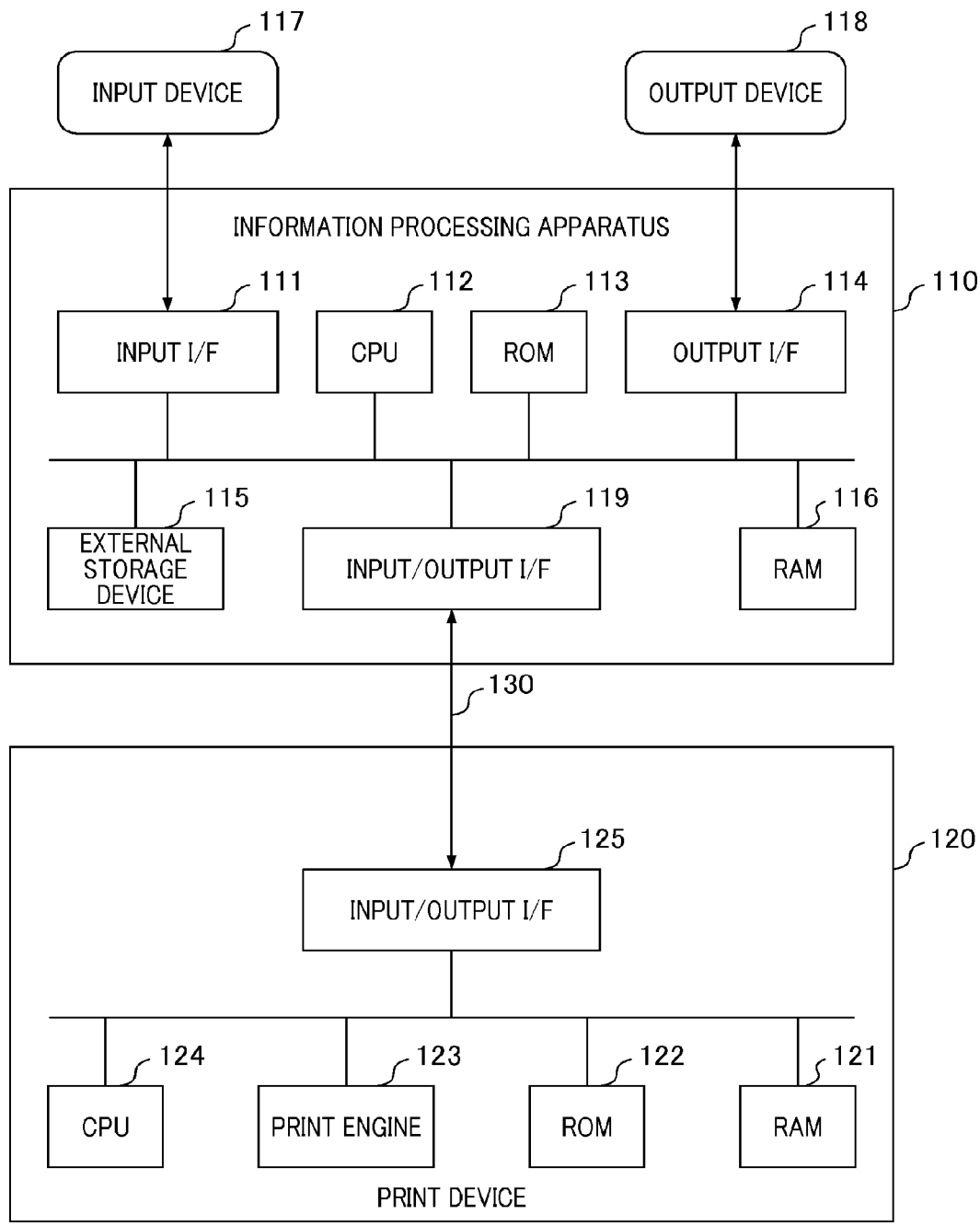
FIG. 1 is a diagram illustrating an example of a configuration of an information processing system of the present embodiment.

FIG. 1 is a diagram illustrating an example of a configuration of an information processing system of the present embodiment. The information processing system includes an information processing apparatus 110 and a print device 120. The information processing apparatus 110 is the information processing apparatus of the present embodiment. The print device 120 is an image forming device such as a printer, an MFP, or the like. The information processing apparatus 110 and the print device 120 are connected to each other via a network 130. The network 130 may be wired or wireless. In this example, the network 130 is an USB (registered trademark) cable.

The information processing apparatus 110 includes an input I/F 111, a CPU 112, a ROM 113, an output I/F 114, an external storage device 115, a RAM 116, an input device 117, an output device 118, and an input/output I/F 119. The ROM 113 stores an initialization program. The external storage device 115 stores an OS, a printer driver, and various types of data. The OS stored in the external storage device 115 is a new OS (e.g., Windows (registered trademark) 8).

The printer driver stored in the external storage device 115 is a next generation driver. Thus, the printer driver cannot use an object having a time-measurement function. The CPU 112 controls the entire information processing apparatus. The input I/F 111 inputs information from the input device 117. The output I/F 114 outputs information to the output device 118. The RAM 116 is a storage unit that is used as a work memory for the CPU 112. The input/output I/F 119 transmits/receives information to/from the print device 120.

The RAM 116 is a storage unit that is used as a work memory for various programs stored in the external storage device 115. The input device 117 is used for inputting data or an operating instruction. The input device 117 is connected to the input I/F 111. The output device 118 is used for displaying data and reporting status. The output device 118 is connected to the output I/F 114.

The print device 120 includes a RAM 121, a ROM 122, a print engine 123, a CPU 124, and an input/output I/F 125. The RAM 121 is a storage unit that is used as a work memory for the CPU 124. The RAM 121 is also used as a buffer for temporarily storing the received data. The ROM 122 stores a control command. The print engine 123 performs printing based on data stored in the RAM 121. The CPU 124 controls the print device 120 in accordance with a control command stored in the ROM 122. The input/output I/F 125 transmits/receives information to/from the information processing apparatus 110. While, in the present embodiment, a description has been given of a print device, the present invention is applicable to a peripheral device such as a scanner device, a fax device, a copy device, a multi-function printer (a combination thereof), or the like.

Figure 2:
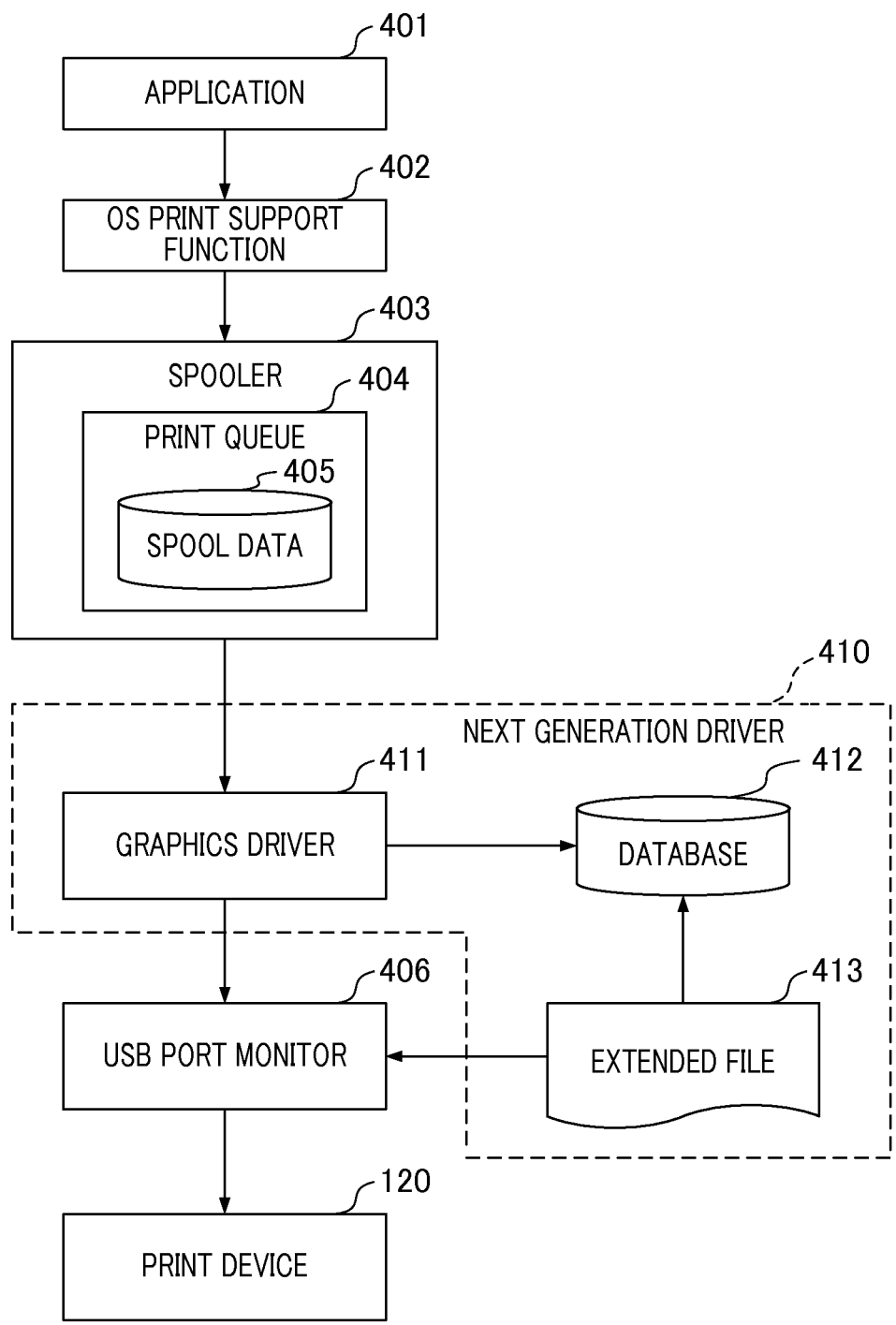
FIG. 2 is a diagram illustrating an example of a configuration of the information processing apparatus of the present embodiment.

FIG. 2 is a diagram illustrating an example of a configuration of the information processing apparatus of the present embodiment. The information processing apparatus shown in FIG. 2 includes an application 401, an OS print support function 402, a spooler 403, a next generation driver 410, and a USB port monitor 406. A method for controlling the information processing apparatus of the present embodiment is realized by the processing units shown in FIG. 2. The computer program of the present embodiment causes a computer to execute the control method. More specifically, the CPU 112 executes the computer program.

The application 401 generates print data. Also, the application 401 functions as a requesting unit that issues a status information request for acquiring status information from the print device 120. Further, the application 401 displays the status of the print device 120 on a screen.

The OS print support function 402 temporarily stores print data created by the application 401 as spool data 405 in a print queue 404 of the spooler 403. The next generation driver 410 includes a graphics driver 411, a database 412, and a port monitor extended file 413. The graphics driver 411 converts the spool data 405 into a print command that is interpretable by the print device 120. The USB port monitor 406 transmits a print command to the print device 120. The port monitor extended file 413 communicates with the print device 120 via the USB port monitor 406 to thereby acquire status information.

The database 412 that is used in the next generation driver 410 is database that can be referred to from the graphics driver 411 and the port monitor extended file 413. The database 412 stores, for example, machine-dependent information and a maintenance command. The graphics driver 411 acquires machine-dependent information required for generating a print command from the database 412.

The next generation driver 410 does not include the UI module 211 provided in the legacy driver 210 shown in FIG.

18. Thus, the next generation driver 410 cannot have GUI for displaying status information about the print device 120. Thus, the next generation driver 410 and the application (hereinafter referred to as "next generation application") 401 that is external application associated with information for identifying the next generation driver 410 provide GUI for displaying status information about the print device 120.

FIG. 3 is a flowchart illustrating an example of operation processing performed by the information processing apparatus of the present embodiment. The next generation application 401 issues a status information request to the spooler 403 (step S501). Next, the spooler 403 issues the status information request to the USB port monitor 406 (step S502).

Next, the USB port monitor 406 that has received the status information request calls the port monitor extended file 413 (step S503). The port monitor extended file 413 is a script file for expanding an OS function, where the script file is described by JavaScript (registered trademark). The port monitor extended file 413 has limitations on which an object having a time-measurement function cannot be used. On the other hand, the next generation application 401 has a function that controls the time interval between processes.

The port monitor extended file 413 communicates with the print device 120 via the USB port monitor 406 to thereby acquire status information (step S504). In other words, the port monitor extended file 413 and the USB port monitor 406 collectively function as an acquiring unit that executes status information acquisition processing from the print device 120 in accordance with the issued status information request. The port monitor extended file 413 analyses the acquired status information and generates response information based on the analysis result to thereby transfer the response information to the USB port monitor 406 and return processing to the USB port monitor 406.

The USB port monitor 406 transfers the response information received from the port monitor extended file 413 to the spooler 403 and returns processing to the spooler 403. The spooler 403 transfers the response information received from the USB port monitor 406 to the next generation application 401 and returns processing to the next generation application 401. The next generation application 401 displays the status of the print device 120 based on the received response information (step S505).

FIGS. 4A to 4C are diagrams illustrating examples of status information, an inquiry by a status information request, and response information to the inquiry. FIG. 4A shows partial status information. The notation "ERR:" denotes a status type indicating the error status of the print device 120. The notation "1234" denotes an error code (in this example, an error code for paper jam). The notation "JOB:" denotes a status type indicating the operation status of the print device 120. The notation "PR" denotes an operation status (in this example, print status). The notation ";" denotes a separator between status types. In other words, status information includes a combination of a key indicating a status type and a value thereof. Although not shown in FIG. 4A, status information data has a start code indicating the start end of data and a terminal code indicating the terminal end of data.

FIG. 4B shows an exemplary inquiry by a status information request. FIG. 4B shows a schema designated by an inquiry. In the schema, the type of status desired by the next generation application 401 is designated. The notation "¥Printer.Status.Summary:StateReason" indicates that an inquiry is made for the detailed status of the print device 120. FIG. 4C shows an example of response information to the inquiry shown in FIG. 4B. The notation "MediaJam" shown in FIG. 4C indicates a paper jam state.

First Embodiment

Figure 5:
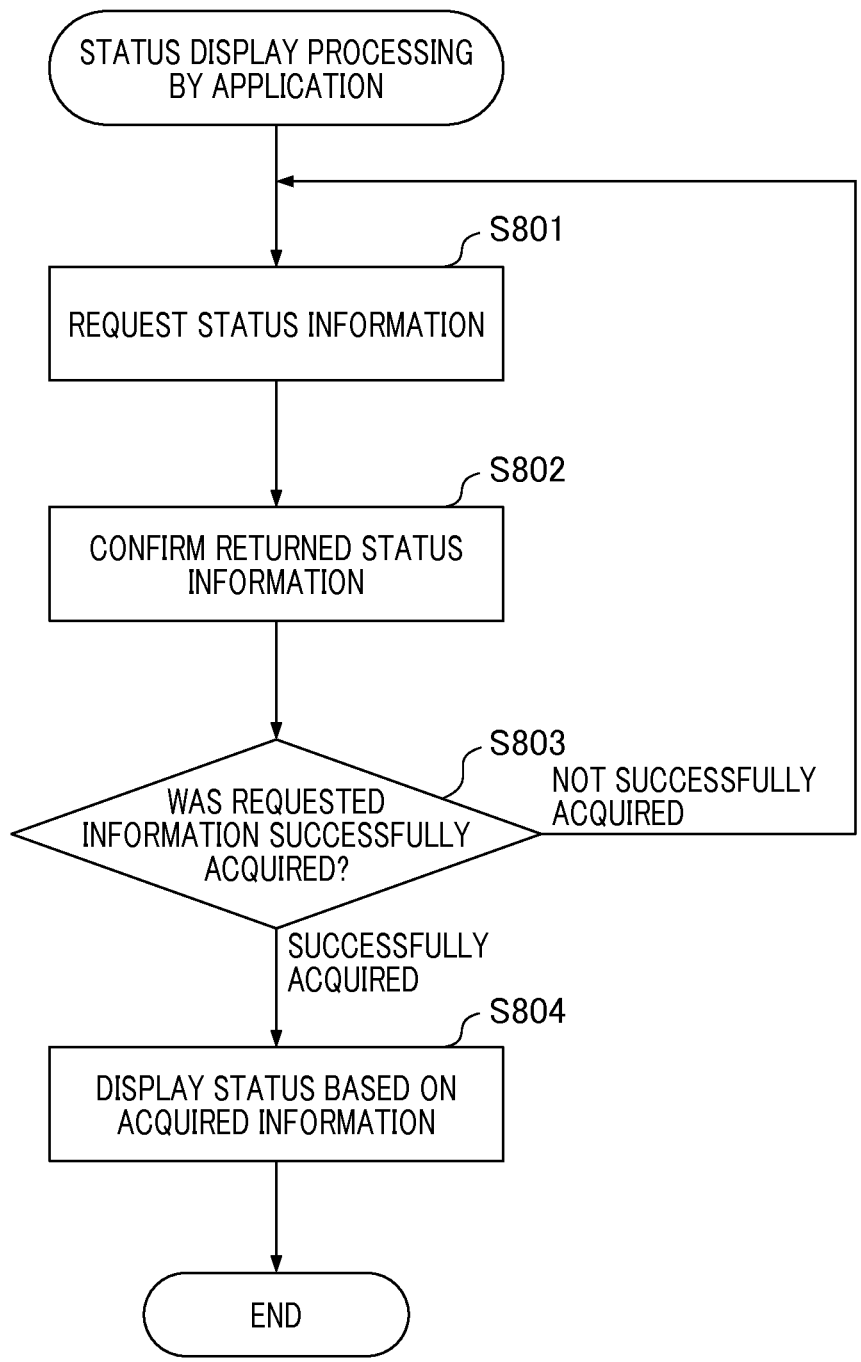
FIG. 5 is a flowchart illustrating an example of status display processing performed by an information processing apparatus according to a first embodiment.

FIG. 5 is a flowchart illustrating an example of status display processing performed by an information processing apparatus according to a first embodiment. Firstly, the next generation application 401 makes a status information request for acquiring status information about the print device 120 to the spooler 403 (step S801). The next generation application 401 designates the type (status type) of a desired status in the status information request. Next, the next generation application 401 confirms the content of the schema of status information (response information) returned from the spooler 403 (step S802).

Next, the next generation application 401 determines whether or not the requested status information was successfully acquired (step S803). In other words, the next generation application 401 determines whether or not response information includes all the information corresponding to the status designated by the status information request. When response information includes all the information corresponding to the status designated by the status information request, the next generation application 401 determines that the requested status information was successfully acquired. When response information does not include all the information corresponding to the status designated by the status information request or when response information includes partial information corresponding to the status but does not include all the information, the next generation application 401 determines that the requested status information was not successfully acquired.

When the next generation application 401 determines that the requested status information was not successfully acquired, the process returns to step S801. Then, the next generation application 401 issues the status information request again. When the next generation application 401 determines that the requested status information was successfully acquired, the next generation application 401 displays the status of the print device 120 based on the acquired status information (step S804). In other words, the next generation application 401 functions as a displaying unit that displays the status of the print device 120 based on response information.

Figure 6:
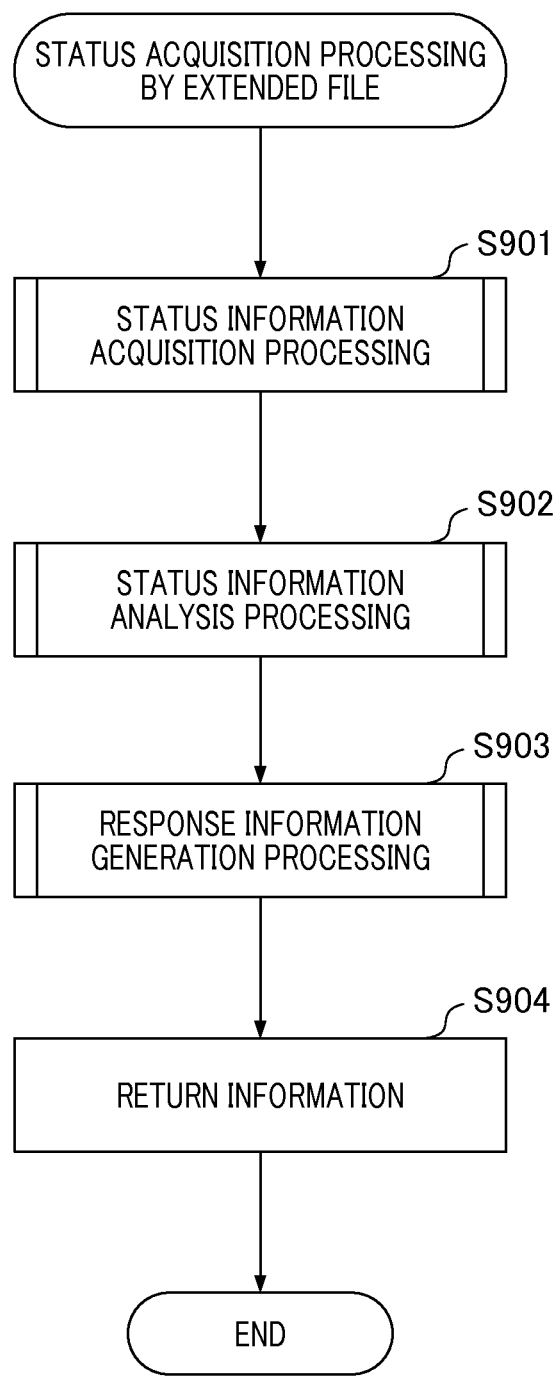
FIG. 6 is a flowchart illustrating an example of status information acquisition processing performed by a port monitor extended file.

FIG. 6 is a flowchart illustrating an example of status information acquisition processing performed by a port monitor extended file. The spooler 403 that has received the status information request made in step S801 shown in FIG. 5 calls the USB port monitor 406. The port monitor extended file 413 that has been called from the USB port monitor 406 executes the following processing. The spooler 403 and the USB port monitor 406 are modules provided by OS and perform processing for delivering a request from an upper-level module to a lower-level module during status information acquisition processing.

The port monitor extended file 413 is called by the USB port monitor 406, and executes acquisition processing for acquiring status information about the print device 120 (step S901). Next, the port monitor extended file 413 analyzes status information about the print device 120 acquired in step S901 (step S902). Next, the port monitor extended file 413 executes response information generation processing based on the analysis result of status information (step S903). Then, the port monitor extended file 413 returns the response information generated in step S903 to the USB port monitor 503 serving as the caller (step S904), and the process ends.

Figure 7:
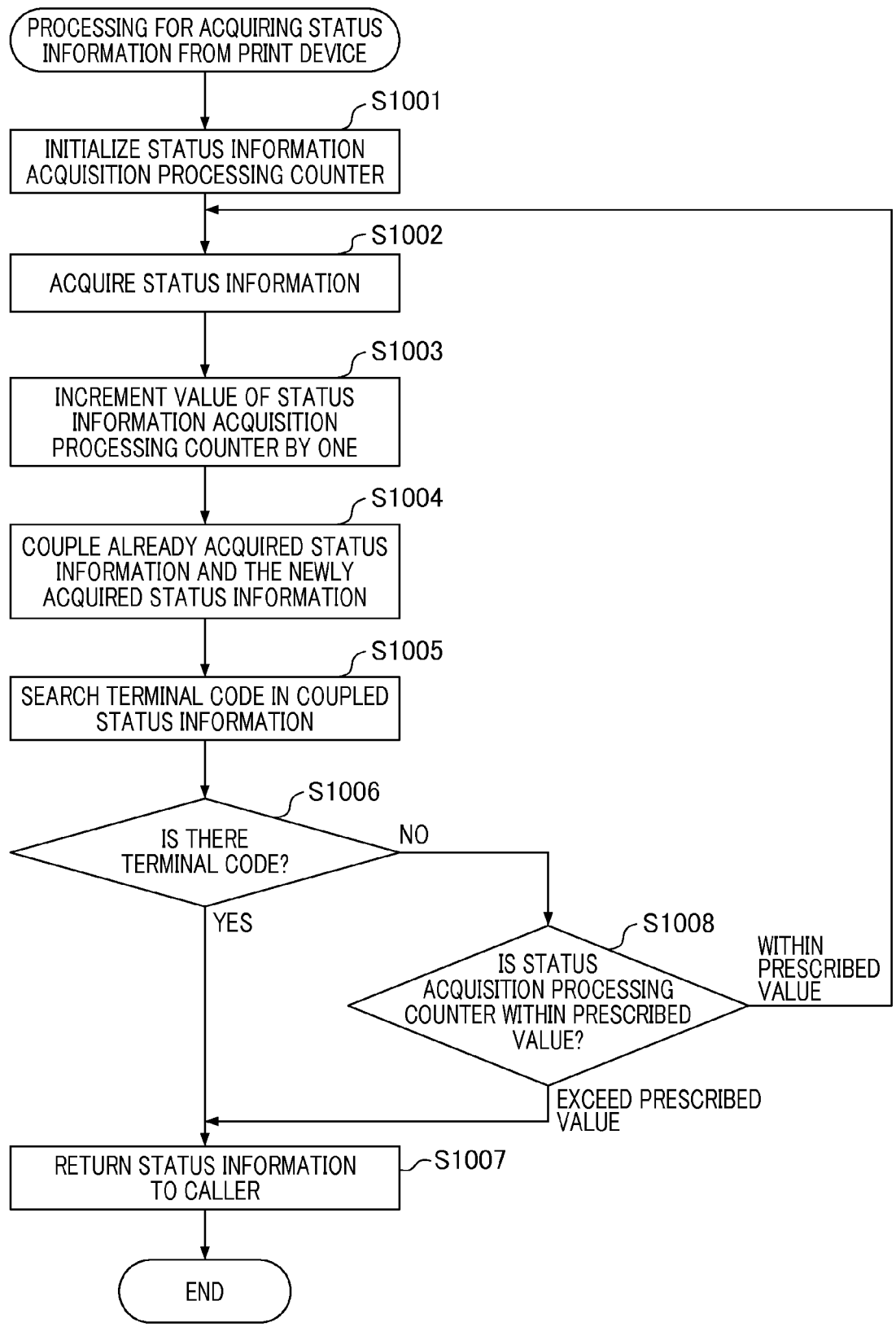
FIG. 7 is a flowchart illustrating the detail of status information acquisition processing.

FIG. 7 is a flowchart illustrating the detail of status information acquisition processing in step S901 shown in FIG. 6. The port monitor extended file 413 initializes a status information acquisition processing counter provided in the next generation driver 410 to zero (step S1001). The status information acquisition processing counter is a counter that records the number of execution times of status information acquisition processing performed by the port monitor extended file 413 (the number of execution times of status information acquisition processing).

Next, the port monitor extended file 413 reads (acquires) status information from the print device 120 (step S1002). More specifically, a predetermined responding unit provided in the print device 120 passes status information about its own device in response to a request from the port monitor extended file 413. Next, the port monitor extended file 413 increments the value of the status information acquisition processing counter by one (step S1003). Next, the port monitor extended file 413 generates coupled information by coupling the already acquired status information and the newly acquired status information in step S1002 (step S1004). In other words, the port monitor extended file 413 functions as a coupling unit that generates coupled information by coupling the acquired status information each time the status information is acquired.

The already acquired status information is information in which the status information acquired by the previous repetitive status information acquisition processing in step S1002 which is repeatedly executed is coupled. The information processing apparatus of the present embodiment repeats status acquisition processing to thereby couple the acquired status information. In this manner, even when all the information cannot be acquired by status acquisition processing at one time, the completed status information can still be acquired.

Next, the port monitor extended file 413 determines whether or not there is a terminal code in coupled information by searching a predetermined terminal code in the coupled information (step S1006). The presence of a terminal code in the coupled information means that all the status information was successfully acquired from the print device 120. In this example, the port monitor extended file 413 functions as a first determining unit that determines whether or not all the status information was successfully acquired from the print device 120 based on the coupled information. In other words, the port monitor extended file 413 functions as a determining unit that determines whether or not there is status information which was not successfully acquired from a peripheral device. When the port monitor extended file 413 determines that there is a terminal code in the coupled information, the port monitor extended file 413 determines that all the status information was successfully acquired from the print device 120, that is, there is no status information which was not successfully acquired from the print device 120. Then, the port monitor extended file 413 returns the acquired status information to the caller (step S1007).

When the port monitor extended file 413 determines that there is no terminal code in the coupled information, that is, there is status information which was not successfully acquired from the print device 120, the process advances to step S1008. Then, the port monitor extended file 413 functions as a second determining unit that executes the following processing. The port monitor extended file 413 compares the value of the status acquisition processing counter with a predetermined threshold value to thereby determine whether or not the value of the status acquisition processing counter is within a threshold value (step S1008). When the port monitor extended file 413 determines that the value of the status acquisition processing counter is within a predetermined threshold value, the process returns to step S1002. Then, the port monitor extended file 413 re-executes status information acquisition processing. In other words, when the port monitor extended file 413 determines that there is status information which was not successfully acquired from the print device 120, the port monitor extended file 413 acquires status information from the print device 120 until the number of acquisitions reaches a prescribed number of times.

When the port monitor extended file 413 determines that the value of the status acquisition processing counter exceeds a predetermined threshold value, the process advances to step S1007. In other words, when the port monitor extended file 413 determines that there is status information which was not successfully acquired from the print device 120 and the number of acquisitions has reached a prescribed number of times, the port monitor extended file 413 returns the acquired status information to a request source. In this manner, even when status information acquired from the print device 120 is incomplete as status information, the status information is returned to the caller and is subject to status information analysis processing shown in FIG. 8. Consequently, the number of repetitions of status information acquisition processing can be equal to or less than a threshold value, status information acquisition processing can be prevented from being indefinitely repeated for a short period of time.

Figure 8:
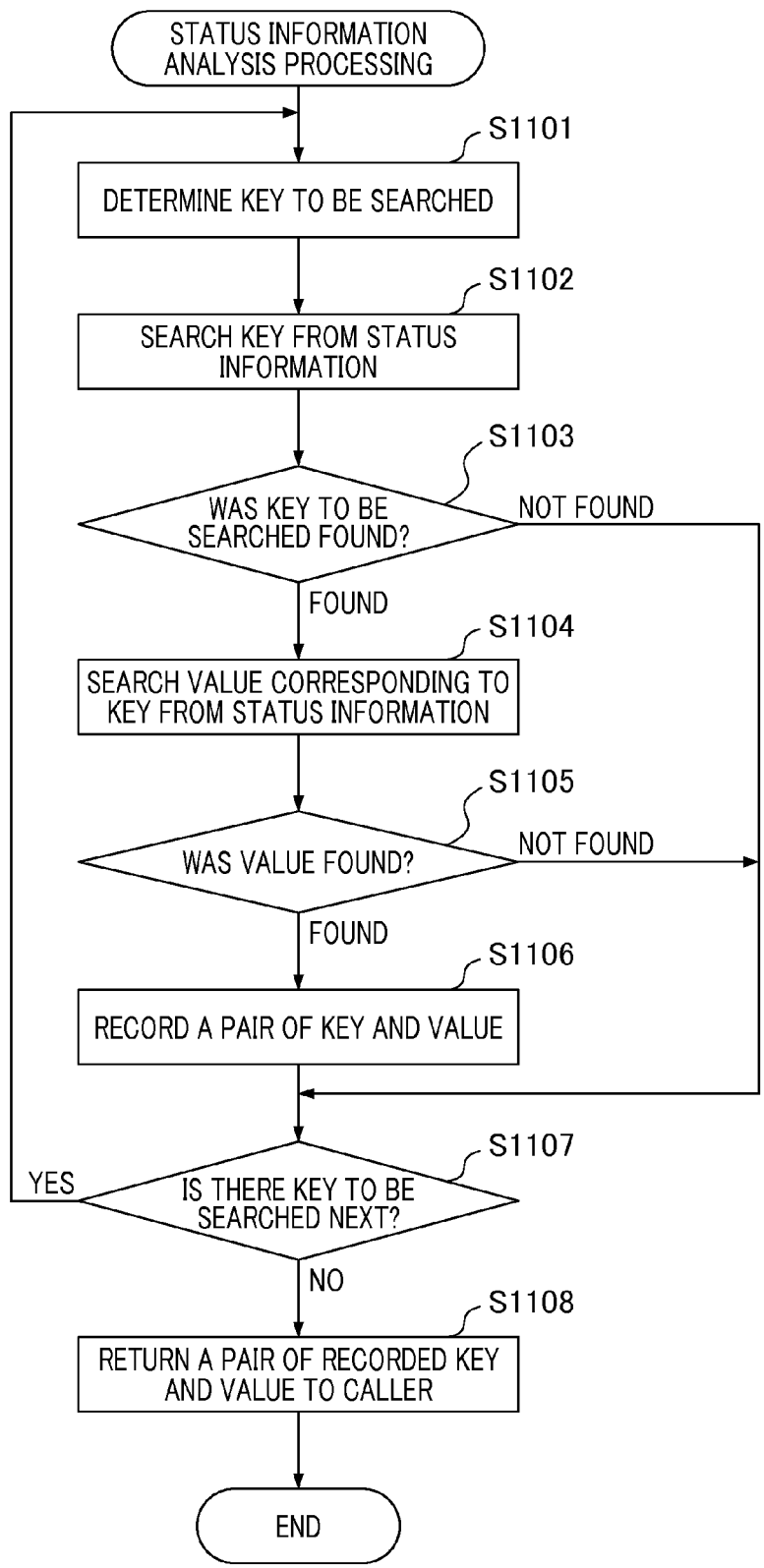
FIG. 8 is a flowchart illustrating the detail of status information analysis processing.

FIG. 8 is a flowchart illustrating the detail of status information analysis processing in step S902 shown in FIG. 6. As described with reference to FIG. 4A, status information includes a combination of a key indicating a status type and a value thereof. Thus, firstly, the port monitor extended file 413 determines a key to be searched in status information (step S1101). The port monitor extended file 413 determines that which key is to be searched depending on the type of status designated by the status information request made by the next generation application 401.

Next, the port monitor extended file 413 searches the key determined in step S1101 in status information (step S1102). Next, the port monitor extended file 413 determines whether or not the key to be searched was successfully found (step S1103). When the port monitor extended file 413 determines that the key to be searched was not successfully found, the process advances to step S1107. When the port monitor extended file 413 determines that the key to be searched was successfully found, the process advances to step S1104.

In step S1104, the port monitor extended file 413 searches a value corresponding to the key searched in step S1102 in status information and acquires the value (step S1104). In other words, the port monitor extended file 413 acquires information corresponding to the status designated by the status information request from the coupled information (status information). Next, the port monitor extended file 413 determines whether or not a value corresponding to the key searched in step S1102 was successfully acquired (step S1105). When the port monitor extended file 413 determines that a value corresponding to the key searched in step S1102 was not successfully acquired, the process advances to step S1107. When the port monitor extended file 413 determines that a value corresponding to the key searched in step S1102 was successfully acquired, the process advances to step S1106.

In step S1106, the port monitor extended file 413 records the key searched in step S1102 in association with the value searched in step S1104 (step S1106), and the process advances to step S1107.

Next, the port monitor extended file 413 determines whether or not there is a key to be searched next (step S1107). When the port monitor extended file 413 determines that there is a key to be searched next, the process returns to step S1101.

When the port monitor extended file 413 determines that there is no key to be searched next, the port monitor extended file 413 returns the combination of the already recorded key and value to the caller (step S1108), and the process ends.

Figure 9:
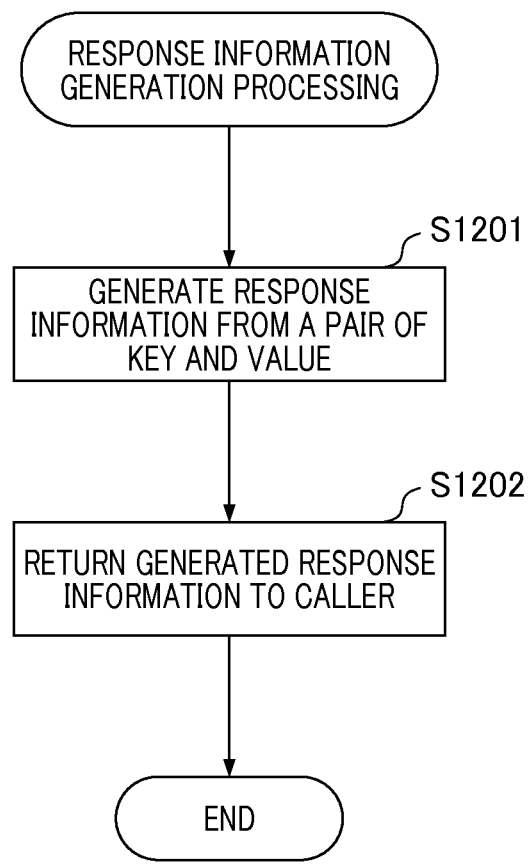
FIG. 9 is a flowchart illustrating the detail of response information generation processing.

FIG. 9 is a flowchart illustrating the detail of response information generation processing in step S903 shown in FIG. 6. Firstly, the port monitor extended file 413 generates response information including the key and the value as return information based on the combination of the key and the value acquired by status information analysis processing (step S1201). Then, the port monitor extended file 413 returns the generated response information to the caller (step S1202), and the process ends. The USB port monitor 406 that has received response information passes response information to the next generation application 401 via the spooler 403. In other words, the port monitor extended file 413 and the USB port monitor 406 collectively function as a responding unit that responds return information including information acquired by status information analysis processing to the next generation application 401.

According to the information processing apparatus of the first embodiment described above, a status information request for a print device can be prevented from being indefinitely repeated for a short period of time even in an OS environment where time-measurement cannot be made during processing by an USB port monitor extended file.

Figure 10:
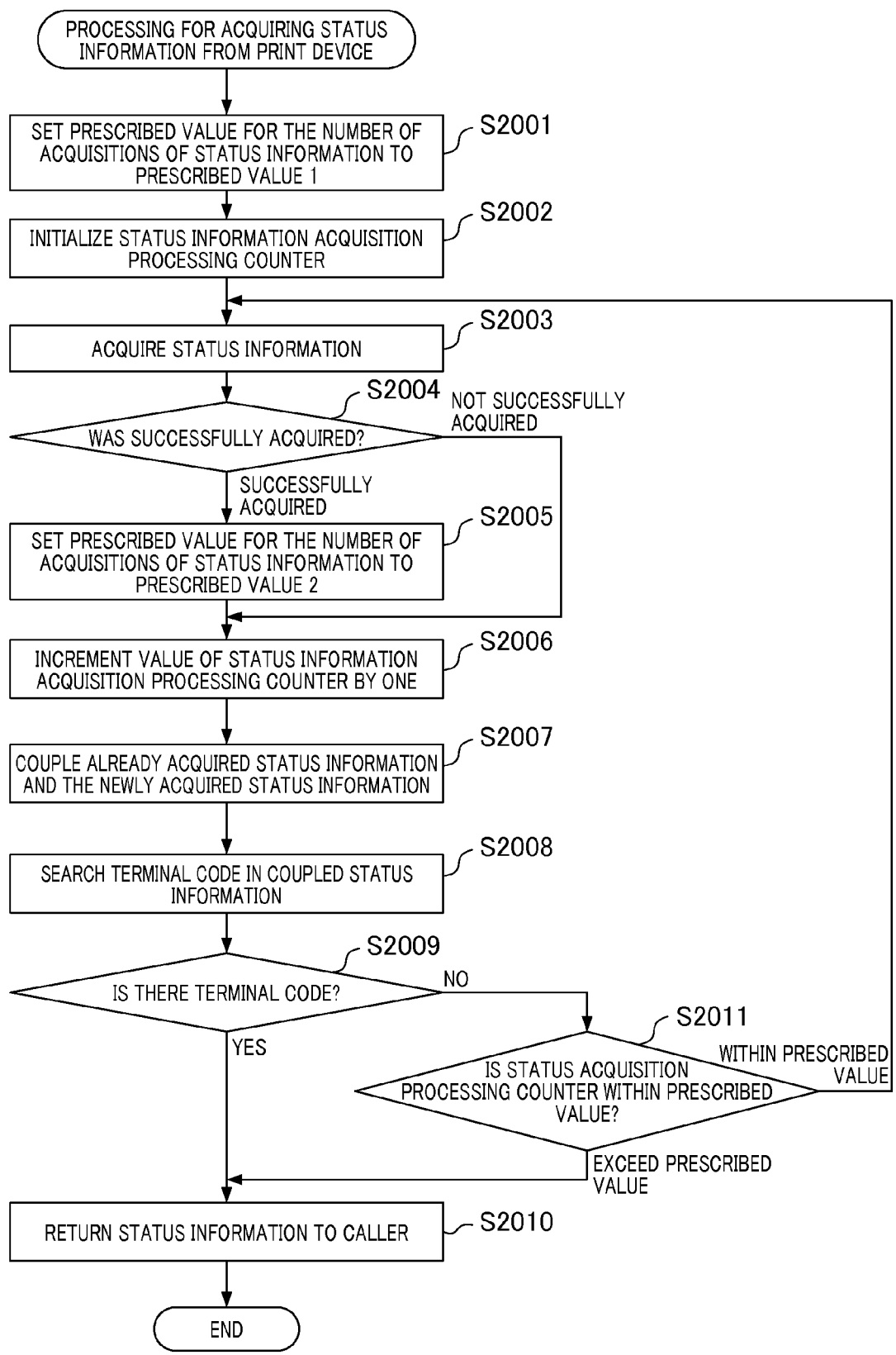
FIG. 10 is a flowchart illustrating status information acquisition processing.

FIG. 10 is a flowchart illustrating status information acquisition processing according to the first variant of the first embodiment. The processes in steps S2002 and S2003 shown in FIG. 10 are the same as those in steps S1001 and S1002 shown in FIG. 7. The processes in steps S2006 to S2011 shown in FIG. 10 are the same as those in steps S1003 to S1008 shown in FIG. 7.

In step S2001 shown in FIG. 10, the port monitor extended file 413 sets the prescribed value for the number of acquisitions of status information to a prescribed value 1 (step S2001). In other words, the port monitor extended file 413 functions as a setting unit that sets a first threshold value (the prescribed value 1) as the initial value for a threshold value (prescribed value) which is compared with the status acquisition processing counter during determination processing in step S2011. In step S2004, the port monitor extended file 413 determines whether or not status information was successfully read (acquired) (step S2004). When the port monitor extended file 413 determines that status information was not successfully acquired, the process advances to step S2006. When the port monitor extended file 413 determines that status information was successfully acquired, the process advances to step S2005.

Next, the port monitor extended file 413 sets the prescribed value for the number of acquisitions of status information to a prescribed value 2 (step S2005). In this example, the port monitor extended file 413 sets a value greater than the prescribed value 1 as the prescribed value 2. Then, the process advances to step S2006. In other words, the port monitor extended file 413 sets a prescribed value which is compared with the status acquisition processing counter during determination processing in step S2011 from the prescribed value 1 to the prescribed value 2 in response to acquisition of status information. The reason why the port monitor extended file 413 sets a prescribed value to the prescribed value 2 is that, when status information was successfully acquired once, it is highly probable that all the status information can be acquired if an attempt is repeatedly made to acquire status information. By setting a prescribed value to the prescribed value 2, it is highly probable that the prescribed value is within the prescribed value 2 during determination processing in step S2011. Consequently, the likelihood for acquiring all the status information increases.

Figure 11:
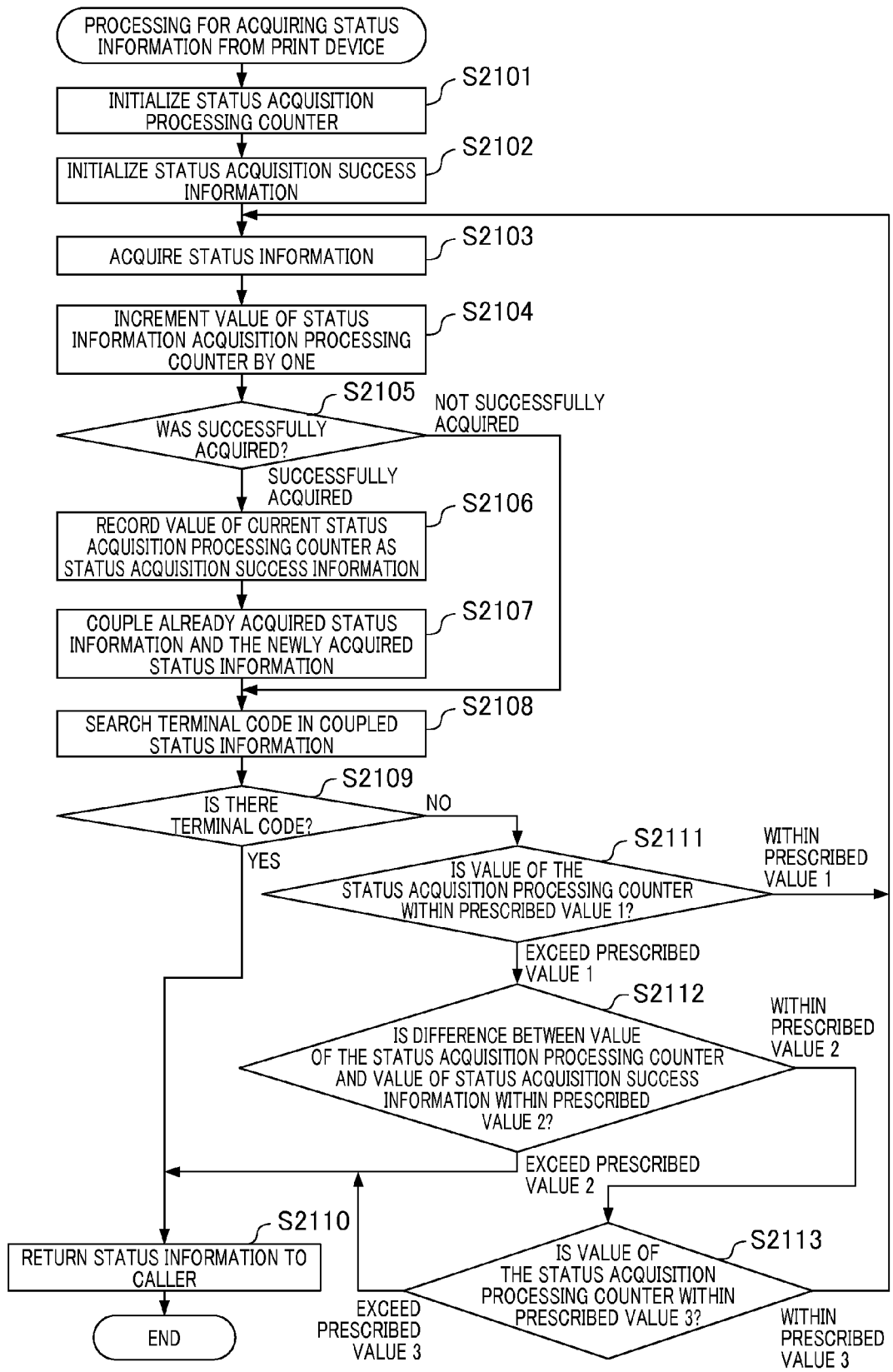
FIG. 11 is a flowchart illustrating status information acquisition processing.

FIG. 11 is a flowchart illustrating status information acquisition processing according to the second variant of the first embodiment. The processes in steps S2101, S2103, S2104, S2105, S2107, S2108, S2109, and S2110 shown in FIG. 11 are the same as those in steps S2002, S2003, S2006, S2004, S2007, S2008, S2009, and S2010 shown in FIG. 10.

In step S2102 shown in FIG. 11, the port monitor extended file 413 initializes status acquisition success information (step S2102). The status acquisition success information is information having the value of the status acquisition processing counter obtained when acquisition processing for acquiring status information from the print device 120 was finally succeeded.

When the port monitor extended file 413 determines that status information was successfully acquired during determination processing in step S2105, the port monitor extended file 413 executes the following processing. The port monitor extended file 413 records the value of the current status acquisition processing counter as status acquisition success information (step S2106). The value recorded in status acquisition success information is the number of execution times of status information acquisition processing (the number of execution times upon successful processing) when status information acquisition processing was finally succeeded. In other words, the port monitor extended file 413 functions as a counting unit that counts the number of execution times upon successful processing.

When the port monitor extended file 413 determines that there is a terminal code in the coupled information during determination processing in step S2109, the process advances to step S2111. Then, the port monitor extended file 413 determines whether or not the value of the status acquisition processing counter is within the prescribed value 1 (first threshold value) (step S2111). The prescribed value 1 is determined in advance by experiments or empirical rules. The prescribed value 1 is, for example, 100.

When the port monitor extended file 413 determines that the value of the status acquisition processing counter is within the prescribed value 1, the process returns to step S2103. When the port monitor extended file 413 determines that the value of the status acquisition processing counter exceeds the prescribed value 1, the process advances to step S2112. In this example, the value of the status acquisition processing counter is, for example, 101. Thus, the port monitor extended file 413 determines that the value of the status acquisition processing counter exceeds the prescribed value 1, and the process advances to step S2112.

Next, the port monitor extended file 413 determines whether or not the difference between the value of the status acquisition processing counter and the value provided in status acquisition success information is within the prescribed value 2, that is, is within the second threshold value (step S2112). The prescribed value 2 is determined in advance by experiments or empirical rules. The prescribed value 2 is, for example, 10.

When the port monitor extended file 413 determines that the difference between the value of the status acquisition processing counter and the value provided in status acquisition success information exceeds the prescribed value 2, the process advances to step S2110. When the port monitor extended file 413 determines that the difference between the value of the status acquisition processing counter and the value provided in status acquisition success information is within the prescribed value 2, the process advances to step S2113.

In this example, it is assumed that the value provided in status acquisition success information upon execution of determination processing in step S2112 is 95. In this case, the difference "6" between the value "101" of the status acquisition processing counter and the value "95" provided in status acquisition success information is within "10" indicated by the prescribed value 2. Thus, in this case, the process advances to step S2113.

Next, the port monitor extended file 413 determines whether or not the status acquisition processing counter is within a prescribed value 3 (step S2113). The prescribed value 3 is determined in advance by experiments or empirical rules. The prescribed value 3 is, for example, 200.

When the port monitor extended file 413 determines that the status acquisition processing counter exceeds the prescribed value 3, the process advances to step S2110. When the port monitor extended file 413 determines that the status acquisition processing counter is within the prescribed value 3, the process returns to step S2103.

Determination processing in step S2113 shown in FIG. 11 may be omitted. In other words, when the port monitor extended file 413 determines that the difference between the value of the status acquisition processing counter and the value provided in status acquisition success information is within the prescribed value 2 during determination processing in step S2112, the process may return to step S2103. According to processing described with reference to FIG. 11, when the number of execution times of status information acquisition processing is small after the acquisition of status information has finally succeeded, the likelihood for re-acquiring status information increases via determination processing in steps S2112 and S2113.

Second Embodiment

Next, a description will be given of a second embodiment. Status information analysis processing in the second embodiment is the same as status information analysis processing described with reference to FIG. 8. Also, response information generation processing in the second embodiment is the same as response information generation processing described with reference to FIG. 9.

Figures 12A, 12B, 13:
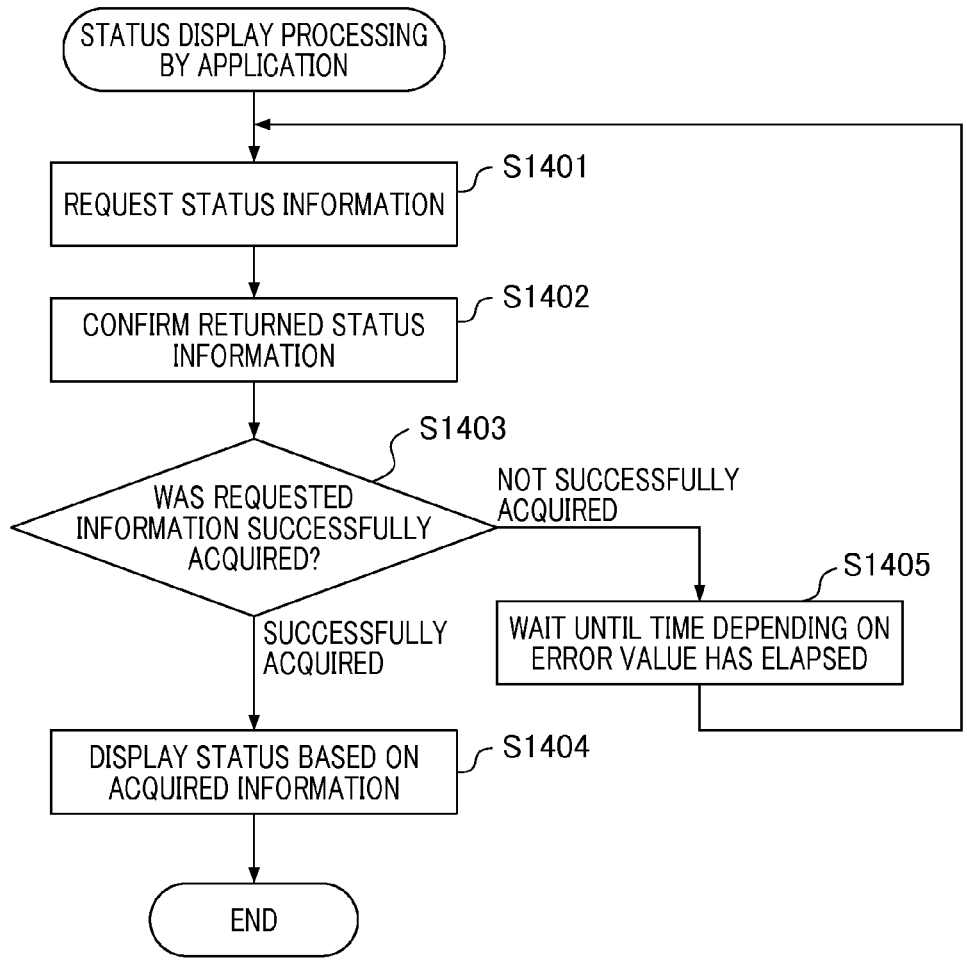
FIG. 12A shows an exemplary inquiry by a status information request.
FIG. 12B shows an example of response information to an inquiry by a status information request.
FIG. 13 is a flowchart illustrating an example of status display processing.

FIGS. 12A and 12B show examples of an inquiry by a status information request and response information to the inquiry according to the second embodiment. FIG. 12A shows an exemplary inquiry by a status information request. As an exemplary inquiry, the notation "¥Printer.Status.Summary:StateReason" indicates that an inquiry is made for the detailed status of the print device 120.

FIG. 12B shows an example of response information to the inquiry shown in FIG. 12A. The notation "MediaJam" shown in FIG. 12B indicates a paper jam state. The notation "ERR1" is an error value indicating that status information was not successfully acquired from the print device 120. The notation "ERR2" is an error value indicating that only partial status information was successfully acquired from the print device 120.

FIG. 13 is a flowchart illustrating an example of status display processing performed by an information processing apparatus according to a second embodiment. The processes in steps S1401 to S1404 are the same as those in steps S801 to S804 shown in FIG. 5. In the second embodiment, when the next generation application 401 determines that the requested status information was not successfully acquired during determination processing in step S1403, the process advances to step S1405.

In step S1405, the next generation application 401 waits until a predetermined time elapses depending on the error value set in response information (step S1405), and the process returns to step S1401. In other words, the next generation application 401 reissues the status information request after standby for a predetermined time depending on the type (error value) of error information set in return information. The next generation application 401 may further determine whether or not a predetermined time has elapsed after the next generation application 401 waited until a time corresponding to an error value designated by response information has elapsed. When a predetermined time has elapsed, the next generation application 401 may display information indicating that the status of the print device 120 was not obtained.

According to the processing described with reference to FIG. 13, a status information request is made after the next generation application 401 waits until a time corresponding to an error value designated by response information has elapsed. Thus, the next generation application 401 can prevent a status information request from being indefinitely repeated for a short period of time.

Figure 14:
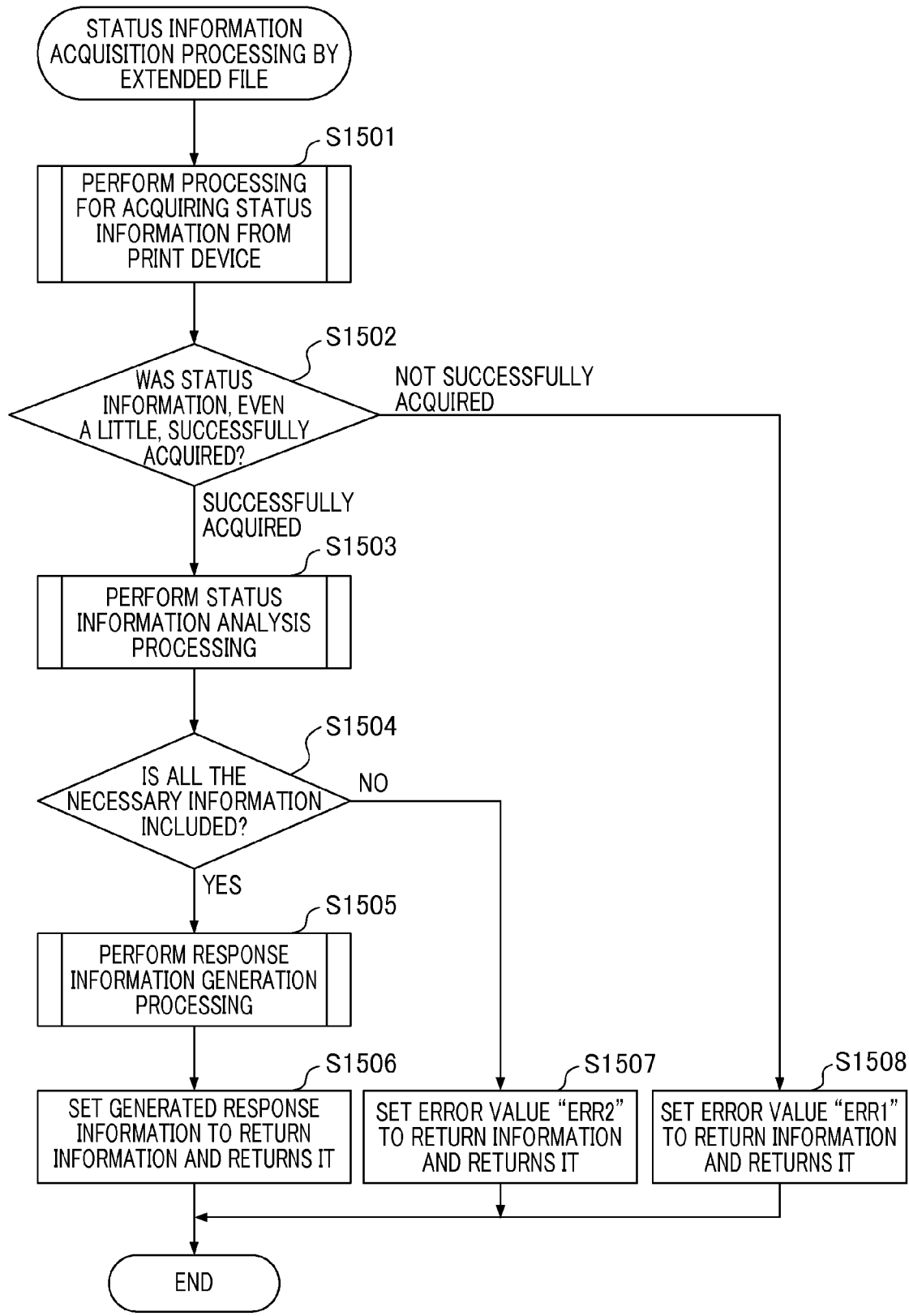
FIG. 14 is a flowchart illustrating an example of status information acquisition processing performed by a port monitor extended file.

FIG. 14 is a flowchart illustrating an example of status information acquisition processing by a port monitor extended file according to the second embodiment. The spooler 403 that has received the status information request made in step S1401 shown in FIG. 11 calls the USB port monitor 406. The port monitor extended file 413 that has been called from the USB port monitor 406 executes the following processing.

The port monitor extended file 413 is called by the USB port monitor 406 and executes acquisition processing for acquiring status information about the print device 120 (step S1501). Next, the port monitor extended file 413 determines whether or not status information, even a little, was successfully acquired (step S1502). When the port monitor extended file 413 determines that status information was not successfully acquired, the process advances to step S1508. Then, the port monitor extended file 413 sets return information to an error value "ERR1", and returns it to the caller (step S1508).

When the port monitor extended file 413 determines that status information, even a little, was successfully acquired, the port monitor extended file 413 executes status information analysis processing (step S1503).

Next, the port monitor extended file 413 determines whether or not the analysis result of status information in step S1503 includes necessary information (step S1504). More specifically, the port monitor extended file 413 determines whether or not information corresponding to the item (key) designated by the status information request is included in the analysis result. When information corresponding to the item (key) designated by the status information request is included in the analysis result, the port monitor extended file 413 determines that the analysis result includes necessary information, and the process advances to step S1505.

In step S1505, response information generation processing is executed (step S1505). Then, the port monitor extended file 413 sets response information generated in step S1505 to return information, and returns it to the caller (step S1506).

When information corresponding to the item (key) designated by the status information request is not included in the analysis result in step S1504, the port monitor extended file 413 determines that the analysis result does not include necessary information, and the process advances to step S1507.

Then, the port monitor extended file 413 sets return information to an error value "ERR2", and returns it to the caller (step S1507).

Figure 15:
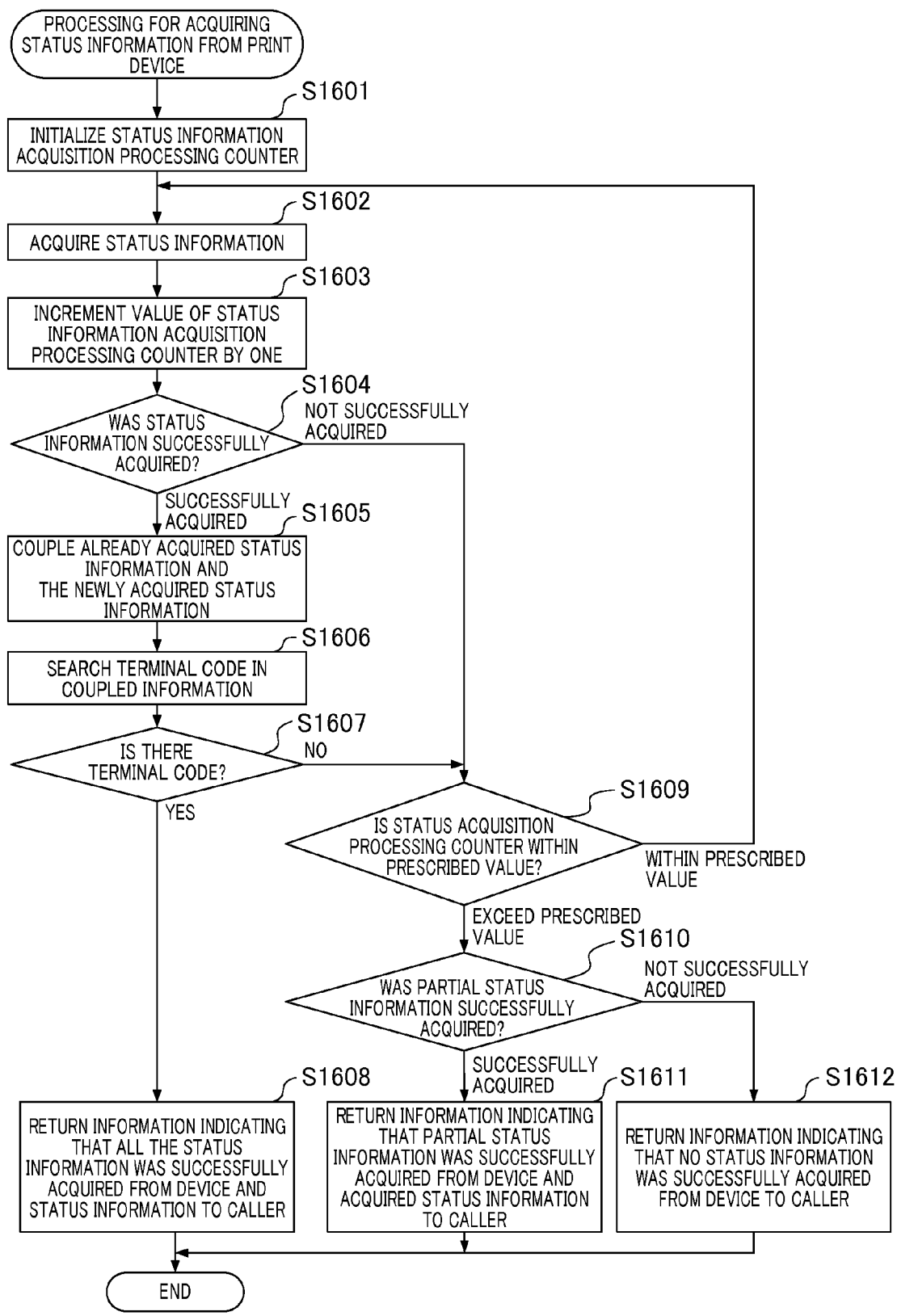
FIG. 15 is a flowchart illustrating the detail of status information acquisition processing.

FIG. 15 is a flowchart illustrating the detail of status information acquisition processing in step S1501 shown in FIG. 14. The processes in steps S1601 to S1603 shown in FIG. 15 are the same as those in steps S1001 to S1003 shown in FIG. 7. The processes in steps S1605 to S1607 shown in FIG. 15 are the same as those in steps S1004 to S1006 shown in FIG. 7. The process in step S1609 shown in FIG. 15 is the same as that in step S1008 shown in FIG. 7.

In the second embodiment, in step S1604 shown in FIG. 15, the port monitor extended file 413 determines whether or not status information was successfully acquired (step S1604). When the port monitor extended file 413 determines that status information was successfully acquired, the process advances to step S1605. When the port monitor extended file 413 determines that status information was not successfully acquired, the process advances to step S1609.

In the second embodiment, when the port monitor extended file 413 determines that there is a terminal code in the coupled information during determination processing in step S1607, the port monitor extended file 413 executes the following processing. The port monitor extended file 413 returns information (information A) indicating that all the status information was successfully acquired from the print device 120 and status information to the caller (step S1608). The information A is information that is used for determination processing in step S1502 shown in FIG. 14 described above. In other words, the port monitor extended file 413 determines that all the status information was successfully acquired based on the information A (the process advances to step S1503 shown in FIG. 14).

Referring back to FIG. 15, in the second embodiment, when the port monitor extended file 413 determines that the value of the status acquisition processing counter exceeds a predetermined threshold value, the process advances to step S1610. Then, the port monitor extended file 413 determines whether or not partial status information was successfully acquired (step S1610). In other words, the port monitor extended file 413 determines whether the coupled information does not include information corresponding to the status designated by the status information request or includes partial information corresponding to the status.

When the port monitor extended file 413 determines that partial status information was successfully acquired, the process advances to step S1611. Then, the port monitor extended file 413 returns information (information C) indicating that partial status information was successfully acquired from the print device 120 and status information to the caller (step S1612). The information C is information that is used for determination processing in step S1502 shown in FIG. 14 described above. The port monitor extended file 413 determines that status information, even a little, was successfully acquired based on the information C, and the process advances to step S1503 shown in FIG. 14. Then, the port monitor extended file 413 returns an error value "ERR2" to the caller via determination processing in step S1504 shown in FIG. 14. In other words, when the port monitor extended file 413 determines that the coupled information includes partial information corresponding to the status designated by the status information request, the port monitor extended file 413 responds with return information in which first error information "ERR2" is set.

When the port monitor extended file 413 determines that the coupled information does not include information corresponding to the status designated by the status information request, the process advances to step S1612. Then, the port monitor extended file 413 returns information (information B) indicating that status information was not successfully acquired from the print device 120 and status information to the caller (step S1612). The information B is information that is used for determination processing in step S1502 shown in FIG. 14 described above. In other words, the port monitor extended file 413 determines that status information was not successfully acquired based on the information B, and the process advances to step S1508 shown in FIG. 14. Then, the port monitor extended file 413 functions as a responding unit that responds return information in which second error information "ERR1" is set.

As described with reference to FIG. 15, when the port monitor extended file 413 determines that there is status information which was not successfully acquired from the print device 120 and the number of acquisitions has reached a prescribed number of times, the port monitor extended file 413 executes the following processing. The port monitor extended file 413 returns information indicating that no status information was successfully acquired or information indicating that partial status information was successfully acquired and the acquired status information to a request source.

According to the information processing apparatus of the second embodiment, the number of repetition times of processing for acquiring status information from a print device can be set to equal to or less than the permitted number of times in a print device even in an OS environment where time-measurement cannot be made during processing by an USB port monitor extended file.

According to the information processing apparatus of the second embodiment, the next generation application 401 can control a time interval for requesting status information depending on the status of status acquisition processing from a print device (whether or not status information was not successfully acquired, partial status information was successfully acquired, or all the status information was successfully acquired).

Figure 16:
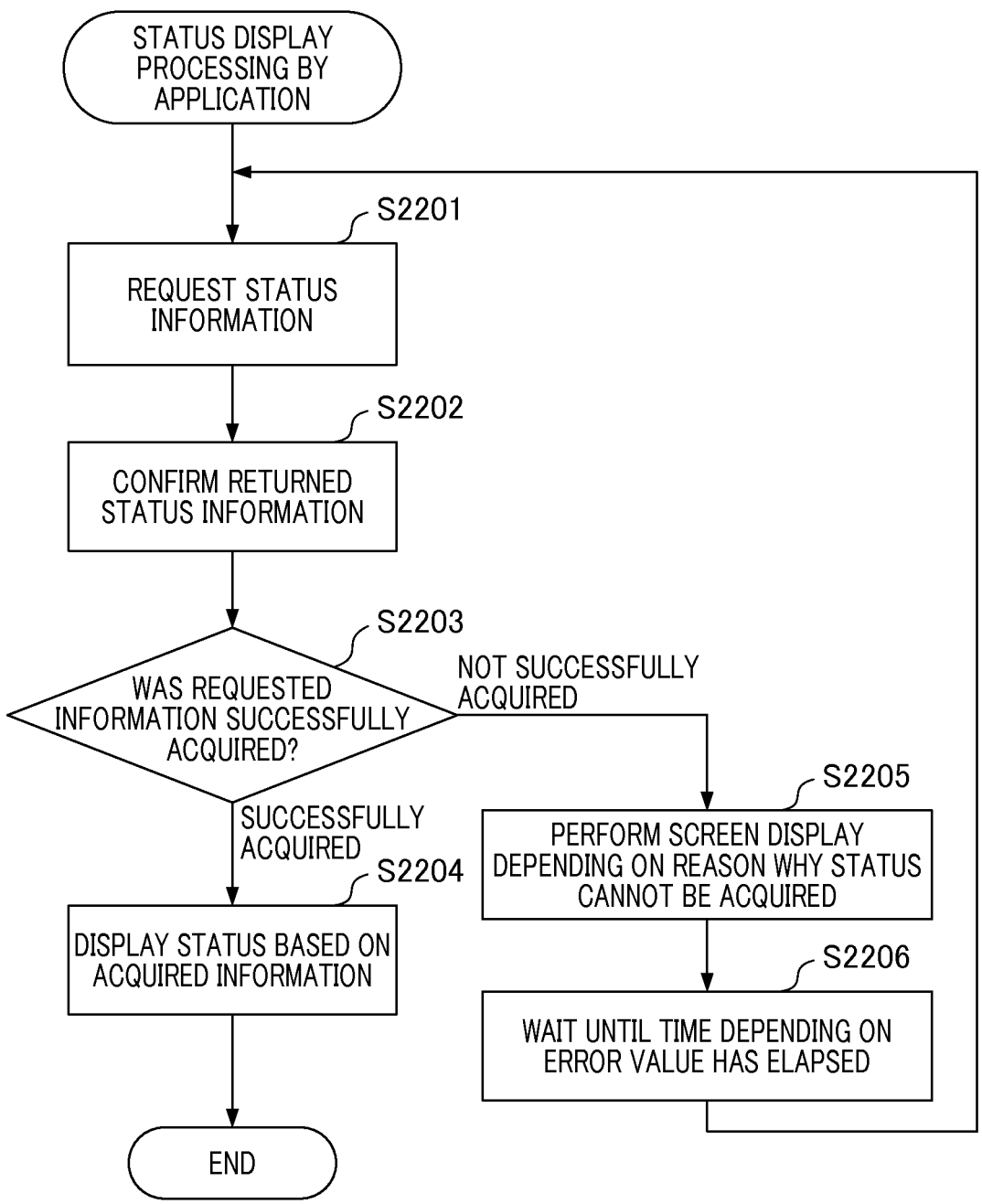
FIG. 16 is a flowchart illustrating an example of status display processing.

FIG. 16 is a flowchart illustrating an example of status display processing performed by an information processing apparatus according to a variant of the second embodiment. The processes in steps S2201 to S2204 shown in FIG. 16 are the same as those in steps S1401 to S1404 shown in FIG. 13. The process in step S2206 shown in FIG. 16 is the same as that in step S1405 shown in FIG. 13.

FIGS. 17A to 17C are diagrams illustrating examples of a status display screen provided by a next generation application. In the variant of the second embodiment, when the next generation application 401 determines that the requested information was successfully acquired during determination processing in step S2203 shown in FIG. 16, the next generation application 401 displays the status of the print device 120 on the screen shown in FIG. 17A in step S2204. The fact that the print device 120 is in a paper jam state is displayed on the screen shown in FIG. 17A.

When the next generation application 401 determines that the requested information was not successfully acquired during determination processing in step S2203 shown in FIG. 16, the process advances to step S2205. Then, the next generation application 401 performs screen display depending on the reason why the status cannot be acquired (step S2205). Then, the process advances to step S2206.

In this example, it is assumed that the reason why the status cannot be acquired is determined in advance depending on an error value. For example, as described above, the notation "ERR1" is an error value indicating that status information was not successfully acquired from the print device 120. The notation "ERR2" is an error value indicating that only partial status information was successfully acquired from the print device 120. Thus, when the next generation application 401 confirms in step S2202 that "ERR1" is set to returned information, the next generation application 401 displays the screen shown in FIG. 17B. When the next generation application 401 confirms in step S2202 that "ERR2" is set to returned information, the next generation application 401 displays the screen shown in FIG. 17C.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-033759 filed on Feb. 20, 2012, which is hereby incorporated by reference herein in its entirety.

What is claimed is:

1. An information processing apparatus comprising:
   a requesting unit configured to issue a status information request for acquiring status information from an image forming device;
   an acquiring unit configured to execute status information acquisition processing from the image forming device in accordance with the issued status information request;
   a coupling unit configured to generate coupled information by coupling the acquired status information each time the status information is acquired;
   a first determining unit configured to determine whether or not a specific code was acquired from the image forming device;
   a second determining unit configured to compare the number of execution times of the status information acquisition processing with a predetermined threshold value when the first determining unit determines that the specific code was not acquired from the image forming device and determine whether or not the number of execution times of the status information acquisition processing is within the threshold value; and
   a responding unit configured to acquire information corresponding to a status designated by the status information request from the coupled information when the second determining unit determines that the number of execution times of the status information acquisition processing exceeds the threshold value and respond with return information including the acquired information.

2. The information processing apparatus according to claim 1, wherein the responding unit determines whether or not the coupled information includes partial information corresponding to a status designated by the status information request in response to a determination made by the second determining unit that the number of execution times of the status information acquisition processing exceeds a predetermined threshold value, and responds return information in which first error information is set to the requesting unit when the responding unit determines that the coupled information includes partial information corresponding to a status designated by the status information request, and
   wherein the requesting unit determines whether or not return information responded from the responding unit includes information corresponding to a status designated by the status information request, and reissues the status information request after standby for a predetermined time depending on the type of error information set in return information responded from the responding unit when the return information does not include information corresponding to a status designated by the status information request.

3. The information processing apparatus according to claim 1, wherein, when the responding unit determines that the coupled information does not include information corresponding to a status designated by the status information request, the responding unit responds return information in which second error information is set to the requesting unit.

4. The information processing apparatus according to claim 1, wherein, when the second determining unit determines that the number of execution times of the status information acquisition processing is within the threshold value, the acquiring unit re-executes the status information acquisition processing, and
   wherein the information processing further comprises a setting unit configured to set a first threshold value as an initial value of the threshold value which is compared with the number of execution times of the status information acquisition processing by the second determining unit, and set the threshold value which is compared with the number of execution times of the status information acquisition processing from the first threshold value to a second threshold value greater than the first threshold value in response to acquisition of the status information by the acquiring unit.

5. The information processing apparatus according to claim 1, further comprising:
   a counting unit configured to count the number of execution times of the status information acquisition processing when the status information acquisition processing by the acquiring unit was last successful as the number of execution times upon successful processing,
   wherein, when the second determining unit determines that the number of execution times of the status information acquisition processing exceeds a first threshold value, the second determining unit determines whether or not the difference between the number of execution times of the status information acquisition processing and the number of execution times upon successful processing is within a second threshold value, and
   wherein, when the second determining unit determines that the difference between the number of execution times of the status information acquisition processing and the number of execution times upon successful processing is within the second threshold value, the acquiring unit re-executes status information acquisition processing from the image forming device.

6. The information processing apparatus according to claim 1, further comprising:
   a displaying unit configured to display the status of the image forming device based on return information responded to the requesting unit.

7. The information processing apparatus according to claim 1, wherein the specific code is a predetermined terminal code; and
wherein the first determining unit determines whether or not the coupled information includes the predetermined terminal code.

8. A method for controlling an information processing apparatus, the method comprising:
issuing a status information request for acquiring status information from an image forming device;
executing status information acquisition processing from the image forming device in accordance with the issued status information request;
generating coupled information by coupling the acquired status information each time the status information is acquired;
determining, in a first determining, whether or not a specific code was acquired from the image forming device;
comparing the number of execution times of the status information acquisition processing with a predetermined threshold value when it is determined in the first determining that the specific code was not acquired from the image forming device and determining, in a second determining, whether or not the number of execution times of the status information acquisition processing is within the threshold value; and
acquiring information corresponding to a status designated by the status information request from the coupled information when it is determined in the second determining that the number of execution times of the status information acquisition processing exceeds the threshold value and respond with return information including the acquired information.

9. The method according to claim 8,
wherein the acquiring further includes:
determining whether or not the coupled information includes partial information corresponding to a status designated by the status information request in response to a determination made in the second determining that the number of execution times of the status information acquisition processing exceeds a predetermined threshold value; and
responding return information in which first error information is set when it is determined in the responding that the coupled information includes partial information corresponding to a status designated by the status information request, and
wherein the issuing includes:
determining whether or not return information responded in the responding includes information corresponding to a status designated by the status information request, and
reissuing the status information request after standby for a predetermined time depending on the type of error information set in return information responded in the responding when the return information does not include information corresponding to a status designated by the status information request.

10. The method according to claim 8, wherein, when it is determined in the responding that the coupled information does not include information corresponding to a status designated by the status information request, the responding further includes responding return information in which second error information is set.

11. The method according to claim 8, wherein the executing includes re-executing the status information acquisition processing when it is determined in the second determining that the number of execution times of the status information acquisition processing is within the threshold value, and
wherein the method further comprises:
setting a first threshold value as an initial value of the threshold value which is compared with the number of execution times of the status information acquisition processing in the second determining, and setting the threshold value which is compared with the number of execution times of the status information acquisition processing from the first threshold value to a second threshold value greater than the first threshold value in response to acquisition of the status information in the executing.

12. The method according to claim 8, further comprising:
counting the number of execution times of the status information acquisition processing when the status information acquisition processing in the executing was last successful as the number of execution times upon successful processing,
wherein the second determining includes determining whether or not the difference between the number of execution times of the status information acquisition processing and the number of execution times upon successful processing is within a second threshold value when it is determined in the second determining that the number of execution times of the status information acquisition processing exceeds a first threshold value, and
wherein the executing includes re-executing status information acquisition processing from the image forming device when it is determined in the second determining that the difference between the number of execution times of the status information acquisition processing and the number of execution times upon successful processing is within the second threshold value.

13. The method according to claim 8, further comprising:
displaying the status of the image forming device based on return information responded to the requesting unit.

14. The method according to claim 8, wherein the specific code is a predetermined terminal code, and
wherein the first determining includes determining whether or not the coupled information includes the predetermined terminal code.

15. A non-transitory storage medium on which is stored a computer program for making a computer execute a method for controlling an information processing apparatus, the method comprising:
issuing a status information request for acquiring status information from an image forming device;
executing status information acquisition processing from the image forming device in accordance with the issued status information request;
generating coupled information by coupling the acquired status information each time the status information is acquired;
determining, in a first determining, whether or not a specific code was acquired from the image forming device;
comparing the number of execution times of the status information acquisition processing with a predetermined threshold value when it is determined in the first determining that the specific code was not acquired from the image forming device and determining, in a second determining, whether or not the number of execution times of the status information acquisition processing is within the threshold value; and
acquiring, in a responding, information corresponding to a status designated by the status information request from the coupled information when it is determined in the second determining that the number of execution times of the status information acquisition processing exceeds the threshold value and respond with return information including the acquired information.

* * * * *